（12） United States Patent
Bud et al.

(10) Patent No.: US 6,741,607 B2
(45) Date of Patent: *May 25, 2004

(54) MULTIPROTOCOL SYSTEM AND DEVICE FOR INFORMATION EXCHANGE

(75) Inventors: Andrew Bud, Ivrea (IT); Antonino Sgroi, Ivrea (IT); Franco Straullu, Ivrea (IT)

(73) Assignee: Olivetti Telemedia S.p.A., Ivrea (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,426

(22) PCT Filed: Sep. 8, 1997

(86) PCT No.: PCT/IT97/00220

§ 371 (c)(1),
(2), (4) Date: Mar. 9, 1999

(87) PCT Pub. No.: WO98/10607

PCT Pub. Date: Mar. 12, 1998

(65) Prior Publication Data

US 2003/0133445 A1 Jul. 17, 2003

(30) Foreign Application Priority Data

Sep. 9, 1996 (IT) .......................... TO96A0737

(51) Int. Cl.[7] ................................ H04L 12/66
(52) U.S. Cl. ................................ 370/463; 455/422.1
(58) Field of Search ........................... 370/277, 280, 370/330, 331, 510, 463, 465, 466, 467, 489, 493; 455/422.1, 426, 462, 465, 562, 560; 375/244

(56) References Cited

U.S. PATENT DOCUMENTS

| 5,349,701 | A | * | 9/1994 | Lobel | |
| 5,422,937 | A | * | 6/1995 | Ferrara | 379/88 |
| 5,467,372 | A | * | 11/1995 | Nishitani | 375/244 |
| 5,598,407 | A | | 1/1997 | Bud et al. | |
| 5,629,976 | A | * | 5/1997 | Loke et al. | 370/280 |
| 5,787,078 | A | * | 7/1998 | Geywitz et al. | 370/331 |
| 5,799,250 | A | * | 8/1998 | Veloso et al. | 455/422 |
| 5,892,794 | A | * | 4/1999 | Slegers | 375/219 |
| 6,047,177 | A | * | 4/2000 | Wickman | 455/422 |

FOREIGN PATENT DOCUMENTS

| EP | 0509548 A | * | 10/1992 |
| EP | 0615396 | * | 9/1994 |
| WO | WO 94 05109 A | * | 3/1994 |
| WO | WO 9609700 | * | 3/1996 |
| WO | WO 96 17484 A | * | 6/1996 |

* cited by examiner

Primary Examiner—Chi Pham
Assistant Examiner—Alexander O. Boakye
(74) Attorney, Agent, or Firm—Banner & Witcoff, Ltd.

(57) ABSTRACT

The present invention refers to a system and device 29 for the exchange of information between a cordless local network 10 using an asynchronous type communication protocol and a fixed telephone network 11 using a synchronous type communication protocol. The local network 10 has a central control unit 13 comprising an electronic computer 15 and one or more devices 29 capable of converting the information coded according to the asynchronous communication protocol into information coded according to the synchronous type protocol. The electronic computer 15 and the devices 29 enable the realization of a cordless telephony service node that is flexible, programmable and easily adaptable to telephone traffic requirements.

18 Claims, 2 Drawing Sheets

MULTIPROTOCOL SYSTEM AND DEVICE FOR INFORMATION EXCHANGE

TECHNICAL FIELD

The present invention concerns a multiprotocol system for the exchange of information between a cordless local network using a first asynchronous type protocol and a fixed telephone network using a second synchronous type protocol, wherein the information comprises a digital voice a component coded according to the first protocol, wherein the system comprises a central unit and cordless terminals for transmitting the information to the central unit and wherein the central unit comprises converting means for converting the digital voice component from the first protocol to the second protocol.

BACKGROUND ART

From the PCT international patent application published with N. WO 96/09700 a communications system is known for interconnecting a cordless local network to a public network. Similar communications system are also known from the PCT international patent application published with N. WO 96/174884, from the European patent applications published with N. EP 615396 and N. EP 509548, and from U.S. Pat. No. 5,349,701.

The above communications systems provide solutions to different technical problems but relate to systems wherein the information, in particular the voice component, coded in the cordless local network according to the Adaptive Differential Pulse Code Modulation (ADPCM) speech coding standard, is exchanged with the public telephone network wherein the information is coded according to the Pulse Code Modulation (PCM) standard.

The above known systems require in the cordless local network to code the information, voice component or data (non voice component), solely according to the ADPCM speech coding standard; in fact such systems are not able to manage selectively a digital non voice component and a digital voice component through different channels.

From the PCT international patent application published with N. WO 94/05109 and from the U.S. Pat. No. 5,349,701 are also known apparatus for managing the information in the cordless local network, but also such apparatus suffer the constraints of the above systems; in particular such apparatus are able to exchange with the public telephone network information solely coded according to ADPCM speech coding standard.

DISCLOSURE OF INVENTION

Object of the present invention is to realise a system which permits the exchange of information between a cordless local network, using an asynchronous protocol, and a public network, using a synchronous protocol, by overcoming the constraints of the cited prior art and by employing a central unit possessing characteristics of simplicity, flexibility and inexpensiveness.

This object is achieved with the multiprotocol system according to the present invention characterized in that the information further comprises a digital non voice component formatted according to the first protocol (DECT) and in that the central unit comprises interface means for exchanging the digital non voice component with the fixed telephone network.

BRIEF DESCRIPTION OF DRAWINGS

This and other characteristics of the present invention will become apparent when the following description of a preferred embodiment, provided by way of a non-exhaustive example, is considered in conjunction with the accompanying drawings, in which.

BEST MODE FOR CARRYING OUT THE INVENTION

Figure 1:
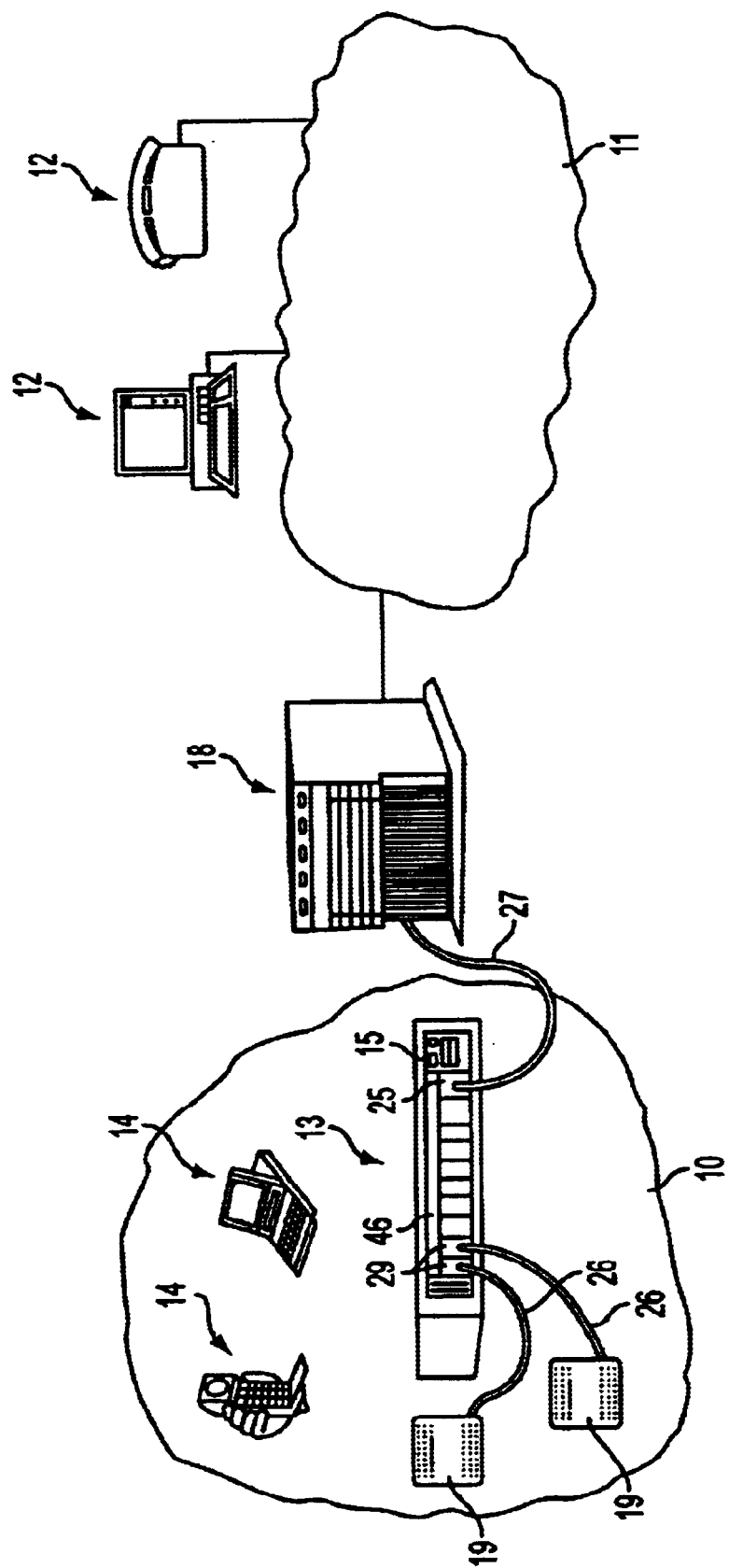
FIG. 1 shows an overall view of the system according to the invention.

With reference to FIG. 1 the multiprotocol system for the exchange of data according to the present invention comprises a local network 10, a public network 11 and a known type private automatic branch exchange 18, suitable for interconnecting and adapting in a known way a predefined number of analog/digital lines of the public network 11 to a predefined number of PCM (Pulse Code Modulation) type digital channels of the local network 10.

The exchange 18 is comprised, for example, by the Meridian model of the NORTEL Inc. company.

Connected to the known type public network 11 is a multiplicity of domestic devices 12, suitable for exchanging data between each other and with the exchange 18 by means of the public network 11; these known type domestic devices 12 are, for example, telephone terminals or personal computers.

The local network 10 comprises a central unit 13 and a plurality of known type portable cordless terminals (portable terminals) 14, for example, telephone terminals or portable personal computers suitable for transmitting and receiving coded data in accordance with the DECT protocol.

The central unit 13 comprises a personal computer (PC) 15, a voice board 25, a plurality of multiprotocol devices (multistandard boards) 29, the subject of the invention, each associated, through a connection cable (radio cable) 26, with a radio module 19.

Figure 2:
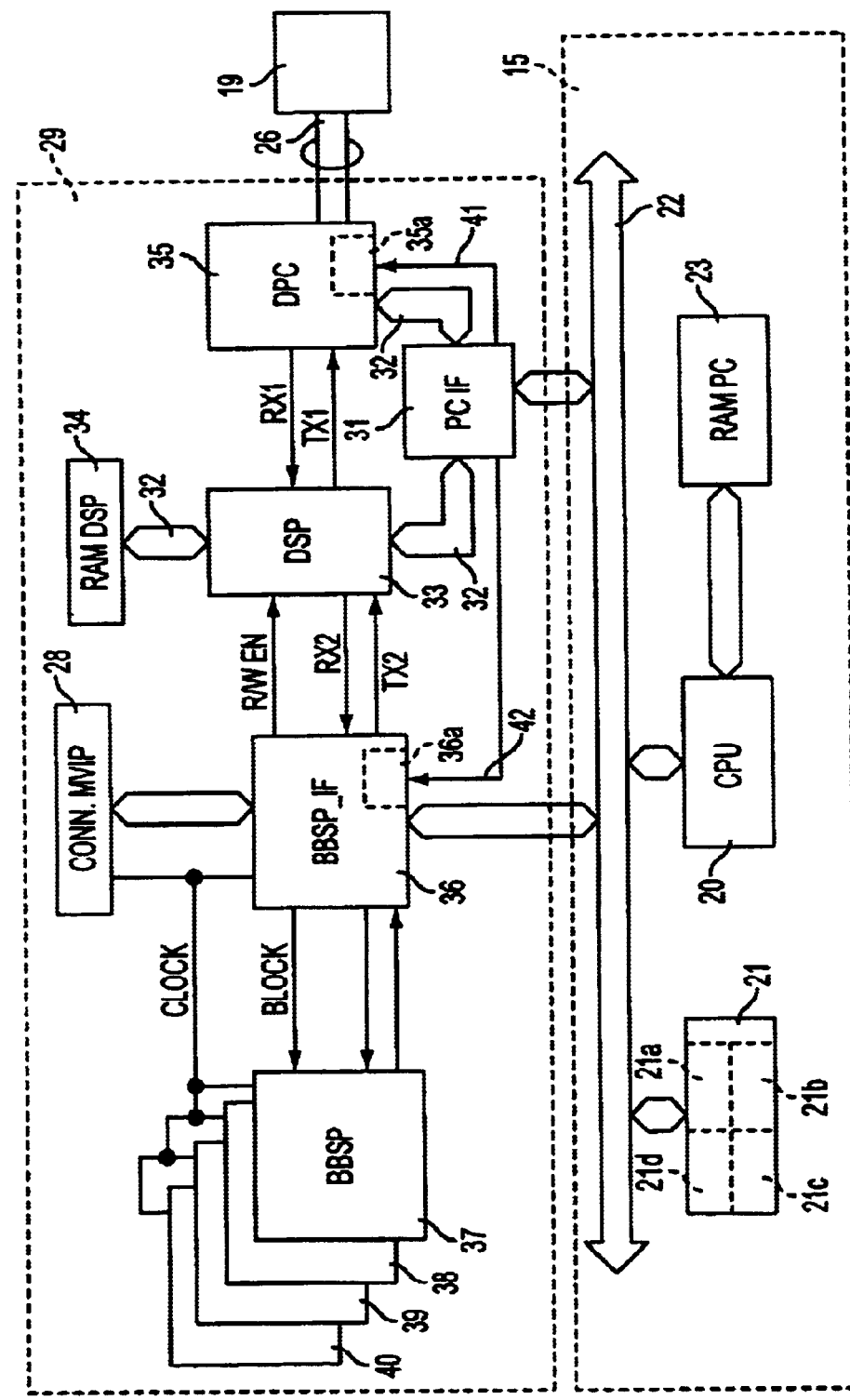
FIG. 2 is a block diagram of the multiprotocol device of the system of FIG. 1.

The PC 15 (FIG. 1 and FIG. 2), of a known type, comprises a central processing unit (CPU) 20, a standard type data channel (ISA BUS) 22, for example an ISA Bus (Industry Standard Architecture Bus), a random access memory (PC RAM) 23 and a mass memory 21, for example, a hard disk unit of a known type.

The CPU 20, the mass memory 21, the voice board 25 and the multistandard boards 29 are connected, in a known way, to the ISA BUS 22 for the transfer and exchange of programs, data and commands among the units connected to it, as will be described in detail hereinbelow.

The PC RAM 23 is connected in a known way to the CPU 20 and is suitable for storing programs controlling operation of the PC 15, of the voice board 25 and of the multistandard boards 29, as will be described in detail hereinbelow.

The mass memory 21 comprises in a first area 21a the programs suitable for being stored in the RAM PC 23 and, respectively, in a second, a third and a fourth area 21b, 21c and 21d, programs suitable for being stored in the multistandard boards 29, as will be described in detail hereinbelow.

The PC 15 is, for example, the M4-100 model produced by the Olivetti S.p.A. company.

The voice board 25 is connected through a PCM cable 27 to the exchange 18 and by B Leans of a known type connection cable (MVIP cable) 46, to the multistandard boards 29 and is suitable for exchanging data respectively with both the exchange 18, emulating one or more PCM channels, and the multistandard boards 29, using the MVIP (Multi-Vendor Integration Protocol) telephone standard for personal computers, as will be described in detail hereinbelow.

The voice board 25 is also suitable for exchanging data, in a known way, between the ISA BUS 22 and the public network 11 and is, for example, the VoiceBridge-PC™ model board produced by the Voice Technologies Group Inc. company.

The multistandard board 29 comprises a known type central control unit (DSP unit) 33, a first programmable logic (DPC) 35, a second programmable logic (BBSP_IF logic) 36 and an interface module (PCIF module) 31 connected to the ISA BUS 22 and suitable for exchanging programs, data and parameters with the PC 15.

The multistandard board 29 further comprises a known type random access memory (RAM DSP) 341 connected to the DSP unit 33 and suitable for storing data and programs, and four known type, logic converting circuits (BBSP modules), respectively 37÷40, for example of the BBSP4CH type produced by Texas Instr., suitable for converting data, i.e. the digital voice component from an ADPCM format (Adaptive Delta PCM, a voice digital coding format used in the DECT standard) to a PCM type format and vice versa. The BBSP modules 37÷40 are also suitable for performing adaptive functions with public telephone lines (echo cancel and echo suppression).

The multistandard board 29 comprises finally a connector (MVIP connector) 28 suitable for being connected, in a known way, to the MVIP cable 46 for exchanging data in PCM format, through the voice board 25, with the exchange 18. The DSP unit 33 is connected to the DPC logic 35 and to the BBSP_IF logic 36 and is suitable, on the basis of the programs stored in the RAM DSP 34, for receiving RX1 data in DECT format from the DPC logic 35, for purging the RX1 data of the control data specific to the DECT protocol, and for sending only the ADPCM format data RX2; i.e. the digital voice component to the BBSP_IF logic 36. In like manner, the DSP unit 33 is also suitable for receiving from the BBSP_IF logic 36 the ADPCM format data to be transmitted TX2, i.e. the digital voice component for equipping this data TX2 with the DECT protocol control data needed for it to be transmitted and for sending the accordingly "packeted" data TX1 to the DPC logic 35.

The DSP unit 33 is also connected, in a known way, through a data channel 32, to the PCIF module 31 and is suitable for receiving from the PC 15 both the programs stored in the area 21b of the mass memory 21 to store them in the RAM DSP 34 and configuration parameters adapted by the PC 15 in function of the data traffic through the DSP unit 33.

The DSP unit 33 is also suitable for exchanging, in a known way, DECT format data, i.e. the digital voice component not coded in ADPCM format, between the ISA BUS 22 and the DPC logic 35, by means of the data channel 32 and the PCIF module 31.

The DSP unit 33 is, for example, the microprocessor for digital signal processing TMS320C56 produced by the Texas Instr. company.

The DPC logic 35 is connected by the radio cable 26, to the radio module 19, and is suitable for managing, in a known way, the transmission and reception of DECT "packets" TX1 and RX1 by performing frequency modulation of the DECT "packets" TX1 and RX1, error checking, and synchronization and control of the connections with the portable terminals 14.

The DPC logic 35 is also connected, in a known way, through both the data channel 32 and a serial link 41, to the PCIF module 31 and is suitable for receiving, through the data channel 32, configuration parameters adapted by the PC 15 in function of the data traffic transiting through the DPC logic 35 itself and, through the serial link 41, is suitable for receiving and storing in an internal memory 35a the programs stored in the area 21c of the mass memory 21 of the PC 15.

The DPC logic 35 is, for example, the FPGA (Field Programmable Gate Array) electronic component with 5000 gates, ORCA1C05, produced by the AT&T company.

The BBSP_IF logic 36 is connected to the BBSP modules 37÷40 and to the MVIP connector 28, and is suitable for enabling the DSP unit 33 to transmit the ADPCM format data RX2, i.e. the digital voice component through an enabling signal R/W_EN, to receive the RX2 data from the DSP unit 33, to select and activate, through a signal BLOCK, one of the BBSP modules 37÷40 to transmit the same RX2 data to the selected BBSP module, to receive the data converted from ADPCM format to PCM format and to transmit it to the voice board 25 by means of the MVIP connector 28.

Similarly the BBSP_IF logic 36 is also suitable for receiving the PCM format data i.e. the digital voice component from the voice board 25, for selecting and transmitting these data to one of the BBSP modules 37÷40, for receiving the data converted from PCM format to ADPCM format, for enabling, through the enabling signal R/W_EN, the DSP unit 33 to receive the ADPCM format data TX2, and to transmit the TX2 data to the DSP unit 33. The BBSP_IF logic (36) is also connected to the ISA BUS 22 and is suitable for receiving from the PC 15 configuration parameters adapted by the PC 15 in function of the data traffic (telephone traffic) transiting through the BBSP_IF logic (36) itself.

Further, the BBSP_IF logic (36) is connected by way of a serial link 42 to the PCIF module 31 and, through the latter, to the PC 15 and is suitable for storing in an internal memory (36a) the programs stored in an area 21d of the mass memory 21.

Finally the BBSP_IF logic 36 is connected through the MVIP connector 28 to the synchronism signal CLOCK of the voice board 25 and is suitable, by means of this signal CLOCK, for maintaining synchronous both the activity between the different BBSP modules 37÷40 and that of the transfers to and from the MVIP connector 28.

The BBSP modules 37÷40 are also connected to the same synchronism signal CLOCK and are suitable for transmitting the converted data to the BBSP_IF logic 36, in function of this CLOCK signal.

The BBSP_IF logic 36 is, for example, the FPGA type electronic component with 5000 gates, ORCA1C05, produced by the AT&T company.

Operation of the system described up to now is as follows. In a first initialization step, the CPU 20 of the PC 15 reads the programs, predefined in the system design stage, from the areas 21a, 21b, 21c and 21d of the mass memory 21 and transmits them, for storage therein, to the RAM PC 23, to the RAM DSP 34 and to the internal memories 35a and 36a of the DPC logic 35 and of the BBSP_IF logic 36.

Once the initialization step has been completed, the system is ready to exchange data between the portable terminals 14 and the domestic devices 12.

For example, if a portable terminal 14, such as a telephone, should asynchronously transmit a DECT "packet", i.e. digital voice component coded according to ADPCM speech coding standard, to the radio module 19, the latter sends it, through the cable 26 to the DPC logic 35 which, once the control and synchronization function, arranged for in the design stage are carried out, sends it on to the DSP unit 33. The latter takes out the control data from the "packets" received, verifies that tie data is coded in ADPCM format and transmits it to the BBSP_IF logic 36, in presence of the enabling signal R/W_EN.

The BBSP_IF logic 36, through the signal BLOCK, selects one of the BBSP modules 37÷40 and transmits the data to the selected BBSP module for it to be converted into PCM format and returned to the BBSP_IF 36.

Once it has received the PCM format data, the BBSP_IF logic 36 transmits it in synchronous mode to the MVIP connector 28 for it to be sent to the exchange 18, by way of the MVIP cable 46 and the voice board 25.

Simultaneously, in a similar but inverse fashion, the transmission is taking place of data from the domestic terminals 12 to the portable terminals 14.

The DSP unit 33, during the phases of operation, transmits the PC 15, by means of the ISA BUS 22, data concerning the current telephone traffic so that the PC 15, in function of the program stored in the RAM PC 23, transmits the BBSP_IF logic 36 the most appropriate configuration parameters.

Where the data is not in ADPCM format, for example digital non voice component not coded in ADPCM data transmitted by a portable terminal 14, such as a portable personal computer, the DSP unit 33 transmits the data, in a known way, by means of the PCIF module 31, to the ISA BUS 22 of the PC 15.

Through this BUS 22, the data reach the voice board 25 where they are coded in PCM format and sent to the exchange 18, by way of the PCM cable 27.

In a second embodiment, a connector, cable and board for interconnection to the exchange 18, according to the known standard SCSA (Signal Computing System Architecture), may be used as an alternative or in addition to the MVIP connector 28 and corresponding circuitry.

In a third embodiment, where the number of channels is low, the voice board 25 Lay be connected directly to the public network 11, without any need for the exchange 18.

In a fourth embodiment, the voice board 25 may be replaced by an equivalent board to that of the example and of a known type, but suitable for being connected to the public network using the known, standard ISDN service (Integrated Services Digital Network)

The PC 15 may also comprise, connected for example to the ISA BUS 22, a board for connection to an Ethernet type local network, in order to enable the exchange of data between the terminals 14 of the local network 10 and other terminals connected to the Ethernet network.

The PC 15 may comprise numerous multistandard boards 29, each capable of interfacing, in the way described by means of the MVIP connector 18 and the MVIP cable 46, with the voice board 25 and consequently with a PCM standard data channel (BUS). In this configuration, the central unit 13 functions as a cordless telephony server capable of interfacing with a public network and also with a private telecommunications network.

This cordless telephony server is surprisingly flexible, being programmable through the PC 15 as described, and inexpensive, as it does not require special equipment.

What is claimed is:

1. A multiprotocol system for the exchange of information between a cordless local network using a first protocol and a fixed telephone network using a second protocol, said information including a digital voice component coded according to said first protocol and a digital non voice component formatted according to said first protocol, said system comprising a central unit and cordless terminals for transmitting said information to said central unit, wherein said central unit comprises:

a first data channel and a second data channel, wherein said second data channel is distinct and independent from said first data channel;

converting means, associated to said first data channel, for automatically converting said digital voice component from said first protocol to said second protocol; and interface means, associated to said second data channel, for automatically exchanging said digital non voice component with said fixed telephone network, said converting means and said interface means being provided for independently transferring said digital voice component and said digital non voice component to said fixed telephone network respectively through said first data channel and said second data channel.

2. A multiprotocol system according to claim 1, wherein said central unit further comprises further converting means associated to said second data channel for converting said digital non voice component into PCM type data coded according to said second protocol.

3. A multiprotocol system according to claim 2, wherein said central unit further comprises an interface device for exchanging said digital non voice component with a local network.

4. A multiprotocol system according to claim 2, wherein said central unit further comprises memory means for storing data and programs for controlling operation respectively of said first data channel and of said second data channel in function of the traffic volume of said digital voice component and of said digital non voice component.

5. A multiprotocol system according to claim 1, wherein said central unit further comprises an interface device for exchanging said digital non voice component with a local network.

6. A multiprotocol system according to claim 1, wherein said central unit further comprises memory means for storing data and programs for controlling operation respectively of said first data channel and of said second data channel in function of the traffic volume of said digital voice component and of said digital non voice component.

7. A multiprotocol system according to claim 1 further comprising a board, configured for connection to an Ethernet network, wherein the board is connected to the second data channel.

8. A multiprotocol device for the exchange of information between a cordless local network using a first protocol and a fixed telephone network using a second protocol, said information including a digital voice component coded according to said first protocol and a digital non voice component coded according to said first protocol, said cordless local network including cordless terminals for transmitting said information, said multiprotocol device comprising:

communication means for receiving said information;

a first data channel and a second data channel, wherein said second data channel is distinct and independent from said first data channel;

converting means, associated to said first data channel, for automatically converting said digital voice component from said first protocol to said second protocol; and interface means, associated to said second data channel, for automatically exchanging said digital non voice component with said fixed telephone network, said converting means and said interface means being provided for independently transferring said digital voice component and said digital non voice component to said fixed telephone network respectively through said first data channel and said second data channel.

9. A multiprotocol device according to claim 8, further comprising control means connected to said communication means both for controlling the transfer of said digital voice component from said communication means to said converting means and for controlling the transfer of said digital non voice component from said communication means to said interface means.

10. A multiprotocol device according to claim 9, further comprising further converting means connected to said second data channel and to said fixed telephone network for converting said digital non voice component into PCM type data coded according to said second protocol.

11. A multiprotocol device according to claim 9, wherein said converting means includes a plurality of converting devices and a logic unit connected to said converting devices for selectively activating said converting devices.

12. A multiprotocol device according to claim 11, further comprising memory means connected to said logic unit for storing data information and programs for controlling operation of said logic unit.

13. A multiprotocol device according to claim 9 further comprising further interface means connected to said second data channel for exchanging said digital non voice component with a local network.

14. A multiprotocol device according to claim 8, further comprising further converting means connected to said second data channel and to said fixed telephone network for converting said digital non voice component into PCM type data coded according to said second protocol.

15. A multiprotocol device according to claim 8, wherein said converting means comprises a plurality of converting devices and a logic unit connected to said converting devices for selectively activating said converting devices.

16. A multiprotocol device according to claim 15, further comprising memory means connected to said logic unit for storing data information and programs for controlling operation of said logic unit.

17. A multiprotocol device according to claim 8 further comprising further interface means connected to said second data channel for exchanging said digital non voice component with a local network.

18. A multiprotocol device according to claim 8 further comprising a board, configured for connection to an Ethernet network, wherein the board is connected to the second data channel.

* * * * *